United States Patent

Gabilondo

[11] Patent Number: 5,573,092
[45] Date of Patent: Nov. 12, 1996

[54] HYDRAULIC BRAKE CLUTCH

[75] Inventor: Francisco L. Gabilondo, Anzuola, Spain

[73] Assignee: Goizper, S. Coop. Ltda., Anzuola, Spain

[21] Appl. No.: 382,697

[22] Filed: Feb. 2, 1995

[30] Foreign Application Priority Data

Feb. 7, 1994 [ES] Spain ................................. 9400215

[51] Int. Cl.$^6$ ................................................ F16D 67/04
[52] U.S. Cl. ................................... 192/18 A; 192/35
[58] Field of Search ........................... 192/18 A, 18 R, 192/12 C, 35

[56] References Cited

U.S. PATENT DOCUMENTS

| | | | |
|---|---|---|---|
| 3,157,257 | 11/1964 | Root | 192/18 A |
| 3,593,353 | 7/1971 | Beneke | 192/18 A |
| 3,713,517 | 1/1973 | Sommer | 192/18 A |
| 4,256,211 | 3/1981 | Katkov | 192/18 A X |
| 4,275,607 | 6/1981 | Snoy | 192/18 A X |
| 4,432,443 | 2/1984 | Sommer | 192/18 A X |
| 4,562,907 | 1/1986 | Maeda | 192/18 A |
| 4,607,736 | 8/1986 | Kelley | 192/18 A |
| 4,739,865 | 4/1988 | Yater et al. | 192/18 A |
| 4,926,989 | 5/1990 | Bruntz | 192/18 A |

FOREIGN PATENT DOCUMENTS 0631717  11/1978  U.S.S.R. ................. 192/18 A

Primary Examiner—Andrea L. Pitts
Attorney, Agent, or Firm—Keck, Mahin & Cate

[57] ABSTRACT

A piston driving a brake and a clutch is split into a main piston and a secondary piston that can travel axially and that are related through limiting bolts. The main piston has a larger surface for the pressurized fluid than the secondary piston. The main piston has a duct through which the fluid flows to the secondary piston which is in turn fitted with springs that bias it, against the fluid tension, against the main piston. Therefore, when connection is made, the secondary piston first approaches the clutch discs without actually contacting the latter. After the brake is released, there is a first connection stage at which the secondary piston approaches the main piston and a second stage, after both pistons come into contact, at which the assembly works conventionally, as a single piston.

2 Claims, 1 Drawing Sheet

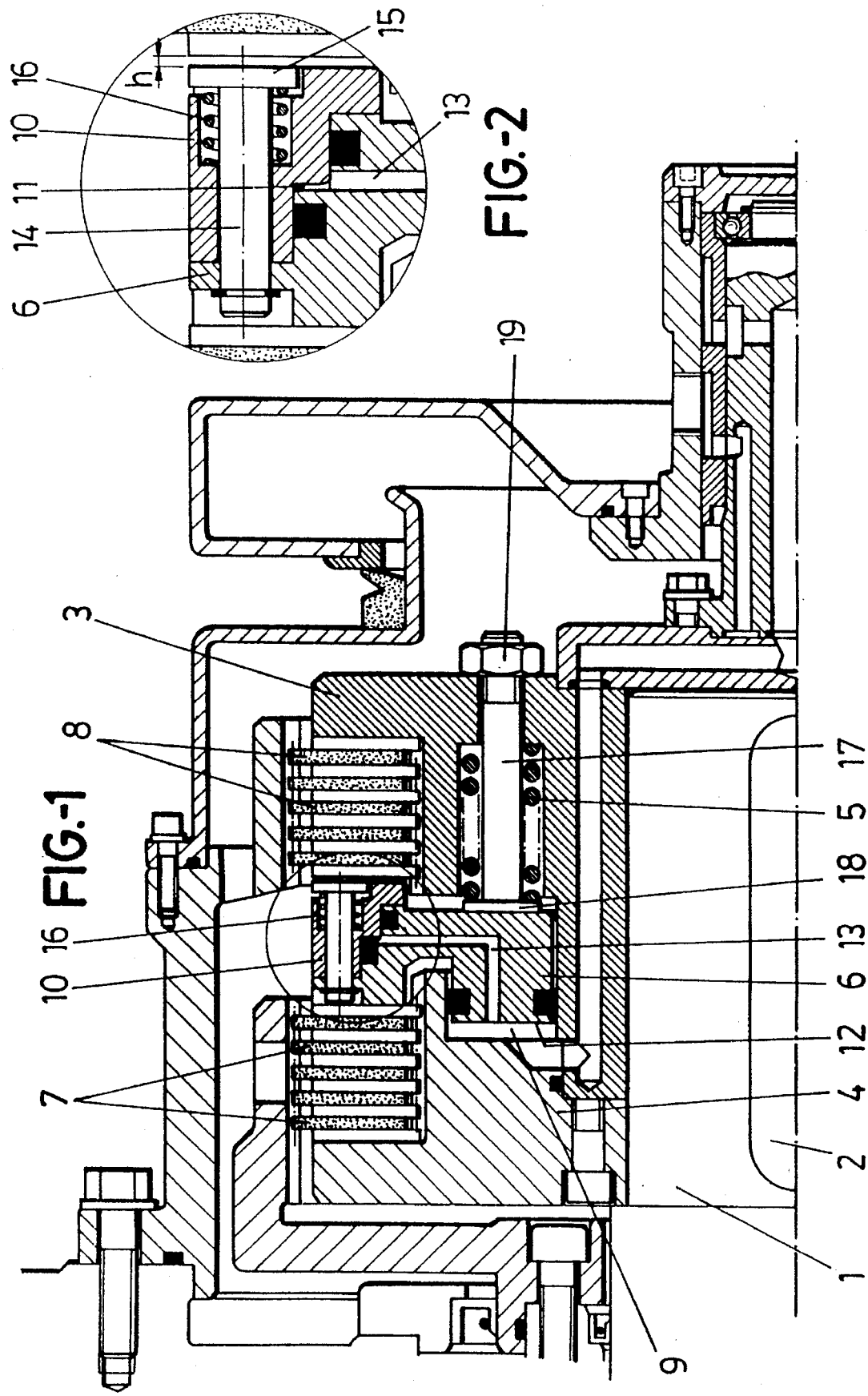

5,573,092

HYDRAULIC BRAKE CLUTCH

OBJECT OF THE INVENTION

The present invention relates to the field of hydraulic brake clutches, in particular as used in driving machines, wherein the brake clutch is usually mounted outside the gearbox, as is customary in presses, cutters and like machines, the improvements being aimed at achieving a smoother connection in such machines, preventing jolting.

BACKGROUND OF THE INVENTION

In various machines and systems, for instance presses, torque is calculated according to the resultant press working torque.

This torque is sometimes too important when starting the machine and hence the instantaneous application thereof causes jolting and undesired effects in its kinematic chain.

This is why connection at a lower torque is required for a short space of time, after which, once the mechanism has been coupled and before the working phase is reached, it must be in a position to yield its full rated torque.

To achieve this, oil input pressure is controlled at below rating values during connection, thereafter to reach rated pressure. This requires sophisticated systems of electrovalves and pressure regulators fitted in the oil connection circuit, which is an expensive and complex solution that requires extensive servicing.

Furthermore the braking torque must be varied or regulated, and in this sense in the conventional conception of brake clutches, external hydraulic systems are also used operating therefrom, causing oil output from the piston not to be free, but at a controlled pressure, partly offsetting the force of the springs. This system is also expensive, and the brake clutch is usually taken apart and some of its springs are removed, which is in practice cumbersome, and not least fitting again the springs removed, if the initial position is to be resumed.

DESCRIPTION OF THE INVENTION

The improvements subject of the invention have been devised to fully solve the above problems, which are twofold as aforesaid.

As for the first aspect, i.e. a smooth starting, the brake clutch piston is split into two pistons, a main piston and a secondary piston, that has a considerably smaller section and is supplied through the main piston, and thus as the main piston is biased towards the braking position due to conventional springs located in the clutch, the secondary piston, which is keyed to the main piston to move with it when it turns, is related thereto through limiting bolts that allow the said secondary piston some travel against the tension of springs that are far weaker than the above-mentioned springs, established within the secondary piston as such and the heads of the said limiting bolts.

When the oil reaches the main piston chamber it therefore goes from such chamber along the ducts crossing through the main piston into the chamber acting upon the secondary piston, which has a smaller section, causing the same to make a first move against its respective springs, at a first stage in which the secondary piston approaches the packet of clutch discs, though without actually contacting the same, defining a minimum clearance that disappears when the oil pressure starts to act upon the main piston, causing its brake to be released, thereby successfully loading the clutch discs at two stages, firstly through the secondary piston and immediately thereafter through the pressure generated by the main piston.

In accordance with another improvement subject of the present invention the springs that usually cause the main piston to project against the brake discs, instead of resting directly upon the said piston, act upon the head of respective screws which slide across the clutch body and have an external retaining nut, and therefore according to the position of the nut the degree of compression of the spring may be adjusted at will and hence the braking torque regulated in a extremely fast and simple manner.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following:

FIG. 1 is a diametric half-section of a hydraulic brake clutch made in accordance with the improvements of e present invention.

FIG. 2 is an enlarged close-view of the foregoing fi at the height of the secondary piston upon which one of the said improvements focuses.

PREFERRED EMBODIMENT OF THE INVENTION

The figures show that the improvements subject hereof are applicable to a hydraulic brake clutch associable to a machine shaft (1) with the assistance of fixing cotters (2) which comprises a clutch (3) and a brake (4), the clutch (3) housing springs (5) that bias a piston (6) against the brake (4), through the respective discs packet (7), a second discs packet (8) being associated to the clutch (3) and receiving the piston (6) action when pressurized oil enters the chamber (9) at a pressure in excess of the pressure of the springs (5).

Now then, in accordance with one of the improvements of the invention, the said piston (6) is split into two sectors, a main piston, that is actually numbered (6), and a secondary piston (10) mounted to slide on the main piston (6) but keyed thereto to move with it when it turns.

This secondary piston (10) has a pushing surface (11) that is rather smaller than the pushing surface (12) of the main piston (6), and oil reaches the said second piston (10) through a duct (13) crossing the main piston (6) as such, as FIG. 1 specifically shows.

The secondary piston (10) is related to the main piston (6) with the assistance of limiting bolts (14) and between such bolts and the secondary piston (10) as such, springs (16) are established whose tension is rather smaller than that of the main springs (5) and which bias the secondary piston (10) against the main piston (6), as FIG. 2 specifically shows.

In accordance with this construction, and as aforesaid, when oil is allowed into the main cylinder, i.e. the chamber (9), the fluid fills the same and passes into the secondary cylinder along a duct (13), causing the secondary piston (10) to move up to the head (15) of the limiting bolts (14), which check the same since they are locked to the main piston (4). At this time clearance "c" between the secondary piston (10) and the clutch discs (8) is at its lowest, though it is greater than "0", to avoid simultaneous braking and connection The oil continues to flow into the main chamber (9) and moves the main piston (6), causing the brake to be released and the clutch plates or discs (8) to be definitively loaded. This loading first begins with the force provided by secondary piston of section "s" with a working pressure "p", and designating this force "f" it is found that:

$$f = s.p$$

which is the starting torque value.

This force lasts while the main (6) and secondary (10) pistons are approaching one another, for once they contact each other the definitive torque becomes "F", namely as follows:

$$F = S.P$$

wherein "S" is the surface (12) of the main piston (6) and "P" the working pressure, as before.

During the time the starting force lasts, the oil in the secondary cylinder or chamber moves back to the main cylinder. This time can be regulated from outside at will, for it is sufficient to throttle the duct to a greater or lesser extent from the accumulator to the electrovalve to regulate the input speed of the fluid.

A low starting torque is thus obtained, regulating its duration.

Going back to clearance "c" between the secondary piston (10) and the clutch discs (8), it must be noted that when the assembly is at rest, i.e. with the brake on, the said distance "c" must be greater than the distance between the secondary piston (10) and the main piston (6) in order that a braking and connection effect can come about simultaneously, for otherwise, i.e. if the clearance "c" is less than the distance between the secondary piston (10) and the main piston (6), the connection stage will begin through such secondary piston (10) before the main piston (6) shall have drawn away from the braking discs (7) and consequently before the brake shall have been released.

In accordance with another improvement of the invention and as aforesaid, instead of acting directly upon the main piston (6), the main springs (5) are mounted upon respective screws (17) the heads (18) of which in fact lie upon the main piston (6), as FIG. 1 shows, which screws (18) freely cross the clutch body (3), and are free to move axially, receiving respective nuts (19) externally that are directly accessible from outside, even if the brake clutch is mounted upon the machine shaft, and therefore if the action of a spring is to be cancelled it is only necessary to tighten the respective nut until the spring is sufficiently compressed.

A very fast and simple operation therefore allows the effectiveness of as many springs (5) as is deemed fit to be eliminated to vary or regulate the braking torque of the brake clutch.

I claim:

1. A hydraulic brake clutch coupled to a machine shaft and comprising:

a clutch having a clutch body, a brake comprising a brake disc packet, a piston fitted between said clutch and said brake, a plurality of springs which permanently bias said piston against the brake disc packet, said plurality of springs secured on the clutch body, said piston being hydraulically movable against said springs towards the brake disc packet, characterised in that said piston is split into a main piston and a secondary piston operating in sequence, the secondary piston is mounted upon the main piston and has axial movement but no angular travel with respect to said main piston, the secondary piston defines an operative surface acted upon by hydraulic pressure, that is smaller than an operative surface of the main piston, pressurized fluid enters a secondary piston chamber through a duct within the main piston, and further comprising:

a plurality of limiting bolts by which the secondary piston is connected to the main piston, each of the limiting bolts having a head and mounting one of a plurality of respective springs which bias the secondary piston against the main piston so that, in a connection operation, the pressurized fluid arrives first, through the duct within the main piston, to the operative surface of the secondary piston and causes the secondary piston to approach the clutch without actually contacting the clutch, contact between the secondary piston and the clutch occurring only after the main piston begins to move and the brake is released so that when said main piston begins to move, only the secondary piston acts upon the clutch, the tension generated by the respective springs works with the main piston, and the pressurized fluid returns towards the main chamber until both the main piston and the secondary piston contact each other axially, contact between the main piston and the secondary piston occurring when all pressure received by the main piston is conveyed to the clutch.

2. A hydraulic brake clutch as defined in claim 1, and further comprising screws upon which the plurality of springs which permanently bias said piston against the brake disc packet are mounted, said screws including heads oriented towards the main piston and which pass through the clutch and are externally fitted with nuts directly accessible from outside of the clutch, said nuts permitting movement of some of said screws into the clutch to render some springs of the plurality of springs inoperative so as to regulate braking torque.

* * * * *